(12) United States Patent
Zhang et al.

(10) Patent No.: US 12,001,488 B2
(45) Date of Patent: Jun. 4, 2024

(54) EFFICIENT DATA STORAGE AND RETRIEVAL SYSTEM

(71) Applicant: Accenture Global Solutions Limited, Dublin (IE)

(72) Inventors: Tianyou Zhang, Singapore (SG); Ramine Tinati, Singapore (SG); Nisith Singh, Singapore (SG); Ming Yang Tham, Singapore (SG); Hai Le, Singapore (SG); Sidharth Mittal, Singapore (SG)

(73) Assignee: Accenture Global Solutions Limited, Dublin (IE)

( * ) Notice: Subject to any disclaimer, the term of this patent is extended or adjusted under 35 U.S.C. 154(b) by 41 days.

(21) Appl. No.: 18/048,727

(22) Filed: Oct. 21, 2022

(65) Prior Publication Data
US 2024/0134915 A1 Apr. 25, 2024

(51) Int. Cl.
*G06F 16/00* (2019.01)
*G06F 16/903* (2019.01)
*G06F 16/906* (2019.01)

(52) U.S. Cl.
CPC ...... *G06F 16/906* (2019.01); *G06F 16/90344* (2019.01)

(58) Field of Classification Search
CPC .............. G06F 16/906; G06F 16/90344
USPC ......................................................... 707/739
See application file for complete search history.

(56) References Cited

U.S. PATENT DOCUMENTS

| 2022/0058227 A1* | 2/2022 | Balakrishnan | G06Q 30/0627 707/707 |
| 2022/0284392 A1* | 9/2022 | Chandrasekhar | G06F 16/258 707/707 |

\* cited by examiner

*Primary Examiner* — Alexandria Y Bromell
(74) *Attorney, Agent, or Firm* — Harrity & Harrity, LLP

(57) ABSTRACT

In some implementations, a device may receive data associated with a set of taxonomies, wherein a taxonomy, of the set of taxonomies, represents a classification of a set of relationships of data entries of the data. The device may integrate the set of taxonomies to generate a meta-taxonomy of the data. The device may generate a data graph of the data based on integrating the set of taxonomies to generate the meta-taxonomy, wherein the data graph is based on a graph-based search model that is associated with at least one of: taxonomy-based filtering, metadata attribute prioritization, or semantic matching. The device may store the data graph.

20 Claims, 8 Drawing Sheets

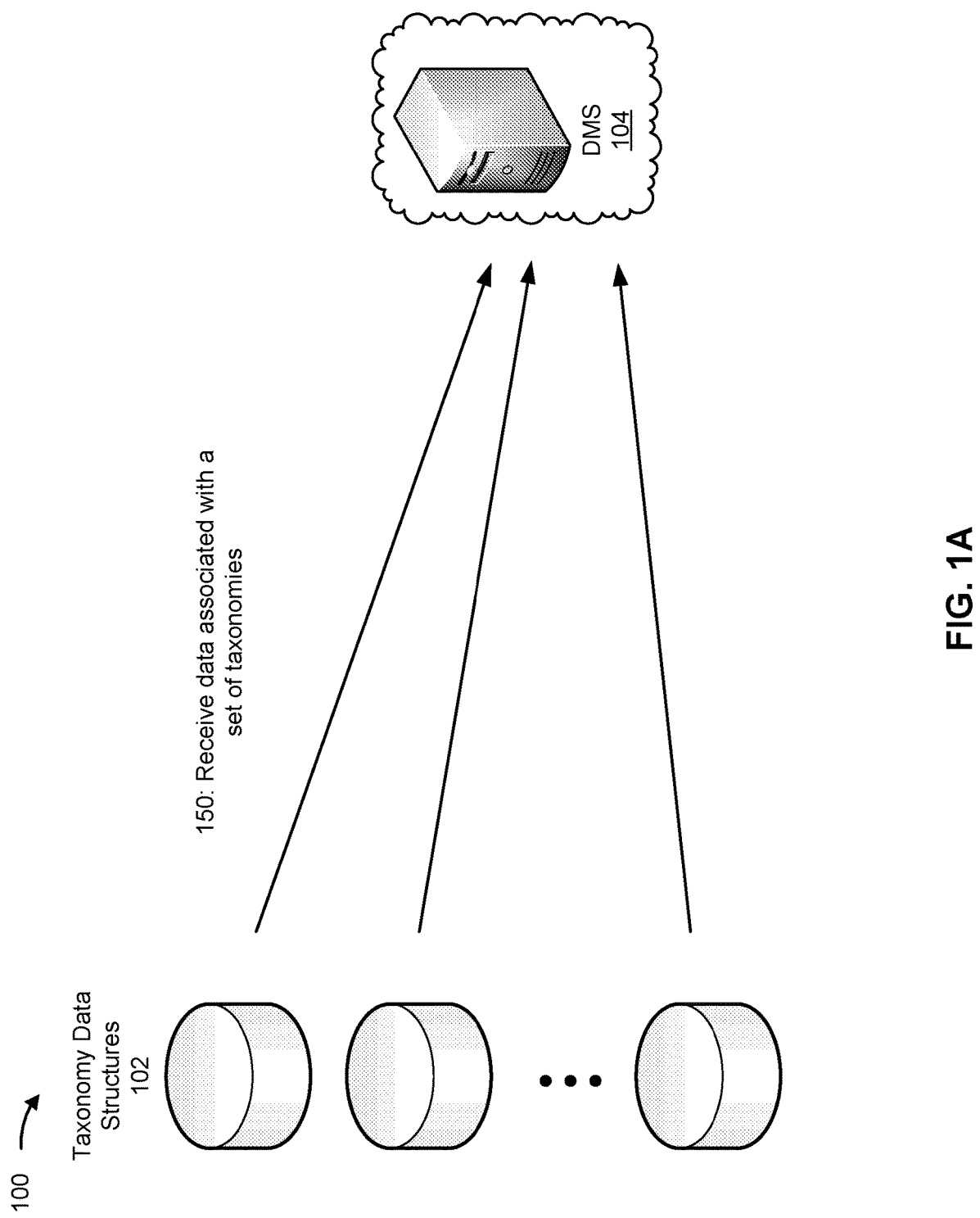

EFFICIENT DATA STORAGE AND RETRIEVAL SYSTEM

BACKGROUND

An information management system may include a data structure storing information identifying a set of items and associated tags. For example, a digital library catalog system may store information identifying a set of books, magazines, or media items and a set of contextual tags, such as authorship tags, publication year tags, or subject tags, among other examples. Some information management systems may provide recommendations or search results as a response to a query for one or more items from the set of items identified and/or stored by the information management system.

SUMMARY

Some implementations described herein relate to a device. The device may include one or more memories and one or more processors communicatively coupled to the one or more memories. The device may be configured to receive data associated with a set of taxonomies. The device may be configured to integrate, using a taxonomy harmonization model, the set of taxonomies to generate a meta-taxonomy of the data. The device may be configured to receive a search query. The device may be configured to search, by the device and using the meta-taxonomy, the data to identify one or more data entries, of the data, matching the search query. The device may be configured to transmit, by the device, a response identifying at least one data entry of the one or more data entries matching the search query.

Some implementations described herein relate to a method. The method may include receiving, by a device, data associated with a set of taxonomies, where a taxonomy, of the set of taxonomies, represents a classification of a set of relationships of data entries of the data. The method may include integrating, by the device and using a taxonomy harmonization model, the set of taxonomies to generate a meta-taxonomy of the data, where the meta-taxonomy includes one or more relationships between a first classification of a first taxonomy, of the set of taxonomies, and a second classification of a second taxonomy, of the set of taxonomies, where the first classification and the second classification are linked with the one or more relationships based on a similarity between the first classification and the second classification. The method may include generating, by the device, a data graph of the data based on integrating the set of taxonomies to generate the meta-taxonomy, where the data graph is based on a graph-based search model that is associated with at least one of: taxonomy-based filtering, metadata attribute prioritization, or semantic matching. The method may include storing the data graph.

Some implementations described herein relate to a non-transitory computer-readable medium that stores a set of instructions for a device. The set of instructions, when executed by one or more processors of the device, may cause the device to receive data associated with a set of taxonomies. The set of instructions, when executed by one or more processors of the device, may cause the device to integrate, using a taxonomy harmonization model, the set of taxonomies to generate a meta-taxonomy of the data. The set of instructions, when executed by one or more processors of the device, may cause the device to receive a search query. The set of instructions, when executed by one or more processors of the device, may cause the device to identify a user profile for a user associated with the search query. The set of instructions, when executed by one or more processors of the device, may cause the device to search the meta-taxonomy to identify one or more data entries, of the data, matching the search query based on the user profile. The set of instructions, when executed by one or more processors of the device, may cause the device to transmit a response identifying at least one data entry of the one or more data entries matching the search query.

BRIEF DESCRIPTION OF THE DRAWINGS

FIGS. 1A-1D are diagrams of an example implementation associated with an efficient data storage and retrieval system.

DETAILED DESCRIPTION

Figure 1B:
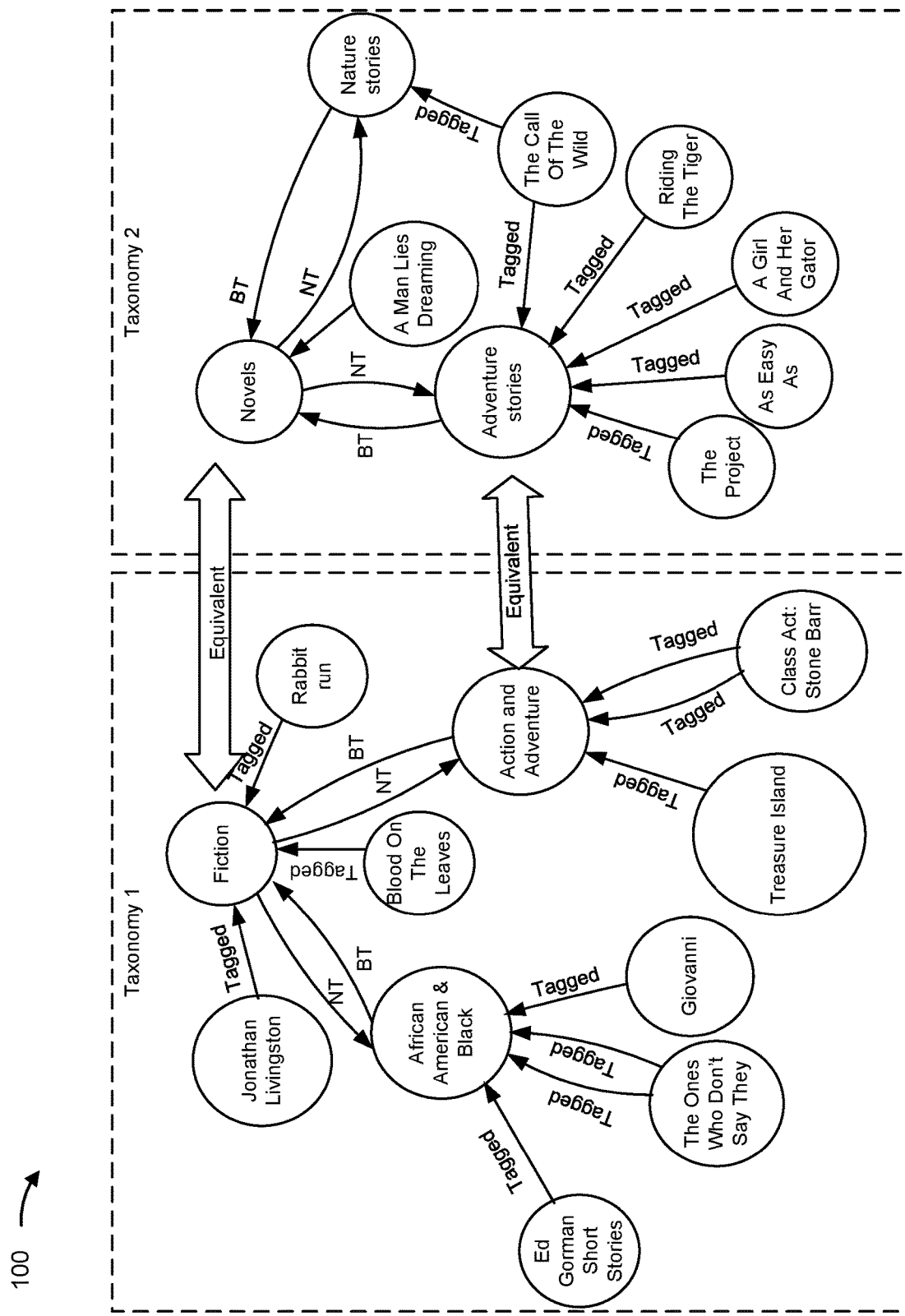

The following detailed description of example implementations refers to the accompanying drawings. The same reference numbers in different drawings may identify the same or similar elements.

Information can be organized using an information management system. For example, a digital library catalog may organize a set of items, such as books, periodicals, video recordings, audio recordings, or works of art, among other examples. An information management system may use a taxonomy of data to organize the set of items. For example, a library catalog may have a set of books tagged with a title, an author name, a subject, a year of publication, a length, a reading level, or a language, among other examples. A search engine associated with the library catalog may provide search results as a response to a search query. For example, the search engine may perform a full-text search of an index of the library catalog to identify one or more items in the library catalog that match the search query. Matching the search query may include having one or more characteristics that satisfy a threshold metric (e.g., a top N results or a top N % of results, among other examples) for matching, such as a word or a version of the word in the search query appearing in a title of an item in the library catalog. Matching other tags may be possible, such as matching an author tag, a subject tag, a description tag, a subject tag, or a geographic area tag, among other examples. For example, a search of "Treasure Isle" may return search results such as "Treasure Isle (video game)" and "Treasure Island (novel)" based on each of the results having a threshold similarity to the search query.

A taxonomy may be used to organize items of content; however, different items of content may be associated with different taxonomies. For example, a set of books may have a first set of tags (e.g., "Author", "Title", "Publication Year", "Subject") and a set of periodicals may have a second set of tags (e.g., "Title", "Publication Frequency", "Subject Matter", "Publication Location") that are at least partially different. In such cases, different vocabularies may be used for defining a taxonomy of a tag. For example, "Subject" or "Subject Matter" tags in the previous example may have different vocabularies. A vocabulary may refer to ways in which the same concept may be tagged. For example, a library catalog may include a first set of subject tags for a book and a book review journal may include a second set of subject tags for the book. In this case, as an example of using different vocabularies for the same or a similar tag, the library catalog may tag a book as an "Action" story, but the book review journal may classify the book as an "Action and Adventure" story. Moreover, different library catalogs from different sources and/or generated at different times may have different sets of tags for the same book. For example, as subjects change or become more granular, different subject tags may be used for the same book. Accordingly, at a first time, a book may be tagged as being in a "Fiction" subject; at a second time, the book may be tagged as being in a "Romance" subject; and, at a third time, the book may be tagged as being in an "Eighteenth Century Romance Novel" subject. The different taxonomies may also cover different items. For example, a first library catalog may cover a first set of books and a second library catalog may cover a second set of books that only partially overlaps with the first set of books.

As a result of the different taxonomies, information retrieval is inaccurate, non-comprehensive, or results in providing search results that are incomplete as a result of disconnectedness across different taxonomies. For example, a search engine associated with a library catalog taxonomy may receive a search query that includes a search term, and may identify a matching tag in a first taxonomy. However, the search engine may fail to obtain results corresponding to items that match a similar tag in a second taxonomy.

Additionally, as some of the taxonomies may not be comprehensive, the search engine may not locate results when identifying a matching tag in the first taxonomy, based on an item of content only being indexed in a second taxonomy (without the matching tag). As a result, computing resources may be wasted with excessive searches for different variations on the same tag or by using different search engines for different databases with items of content indexed using different taxonomies. With regard to recommendations, a recommendation engine, similar to a search engine, may provide, as a result of non-harmonized taxonomies, inaccurate, incomplete, anomalous, or non-comprehensive recommendations (e.g., that are not likely to be selected by a user or that are not the best possible recommendations for the user).

Some implementations described herein provide a data management system to harmonize different taxonomies to enable more efficient data storage and retrieval. For example, a data management system may use a taxonomy harmonization model to analyze different taxonomies for similarities and merge the different taxonomies to generate a meta-taxonomy. The data management system may generate a data graph representing the meta-taxonomy to enable efficient searching and information retrieval from the meta-taxonomy. Without the taxonomy harmonization, such a data graph or knowledge graph would have isolated nodes (e.g., a node for a first taxonomy not connected to an equivalent or similar node for a second taxonomy) so that information identified from a first node in the first taxonomy does not result in also identifying similar information from a second node in the second taxonomy. In contrast, by harmonizing taxonomies to generate a meta-taxonomy, the data management system can artificially generate connections (e.g., edges) between nodes in the data graph, thereby enabling cross taxonomy identification of search results and recommendations. Based on improving a quality or accuracy of search results, the data management system reduces a utilization of computing resources by reducing a quantity of searches that are performed to receive a desired set of results. Similarly, for recommendation generation, based on improving a quality or accuracy of recommendation generation, the data management system reduces a utilization of computing resource by reducing a quantity of recommendations that a user filters through to identify a desired (e.g., correct) recommendation.

Moreover, some implementations described herein enable use of user profile information to generate recommendations. A recommendation may refer to information retrieval results that are prioritized based on matching a prediction of relevance that is based on a user profile. In other words, a search engine may provide search results that are ordered based on how closely the search results match a search query, whereas a recommendation may be a similarly configured information retrieval engine that provides recommendation results that are ordered based on how closely the recommendation results match a user profile. Accordingly, two users providing the same search query are provided with the same results by a search engine. In contrast, a recommendation engine can provide recommendation results that are ordered based on a prediction of relevance to a user. Although recommendation results may be described as an autonomous process, in some cases, recommendation results may be provided in response to a query. Accordingly, two users having different user profiles may be provided with differing recommendations based on differing user profiles.

Some implementations provide a data management system, which may implement a search engine or a recommendation engine, that may determine that a first user reserved, from a library, video content and may provide with video information retrieval results (e.g., a recommendation). In contrast, the data management system may determine that a second user reserved, from the library, a set of books and may provide the second user with book information retrieval results (e.g., another recommendation).

In some implementations, a hybrid search and recommendation system may be possible such that the data management system uses search results as a user-content interaction that may be used for generating a recommendation. For example, when a search returns a set of books as a result, the data management system can use the search results as part of a user profile for generating subsequent recommendations.

FIGS. 1A-1D are diagrams of an example implementation 100 associated with an efficient data storage and retrieval system. As shown in FIGS. 1A-1D, example implementation 100 includes a set of taxonomy data structures 102, a data management system (DMS) 104, and a client device 106. These devices are described in more detail below in connection with FIG. 3 and FIG. 4.

As shown in FIG. 1A, and by reference number 150, the data management system 104 may receive data associated with a set of taxonomies from the taxonomy data structures 102. For example, the data management system 104 may receive data identifying a set of taxonomies of a set of items of content. In some implementations, the data management system 104 may receive information identifying different sets of items of content. For example, the data management system 104 may receive, from a first taxonomy data structure 102, a first taxonomy of a first set of items of content and may receive, from a second taxonomy data structure 102, a second taxonomy of a second set of items of content. In this case, the first set of items of content and the second set of items of content may be wholly overlapping, partially overlapping, or wholly disjoint.

In some implementations, the data management system 104 may receive information identifying a set of tags and generate a data graph for a taxonomy based on the set of tags. For example, the data management system 104 may obtain information identifying a set of descriptive tags of a set of items in a particular data format (e.g., a quote-and-comma delineated format, a comma delineated format, or another format) and may convert the particular data format into a data graph with nodes representing items of content and types of tags and edges representing relationships between items of content and types of tags. In some implementations, the data management system 104 may generate a taxonomy using a natural language processing capability. For example, the data management system 104 may parse a set of reviews of a set of items of content to extract a set of tags for the items of content. As an example, a review of a book may include a natural language description of the book, from which the data management system 104 may extract a subject, a subject matter, a publication date, or an author name, among other examples. In this case, the data management system 104 may generate a data graph representing a taxonomy of items of content based on the natural language description. For example, the data management system 104 may parse an archive of book reviews to generate a taxonomy of books reviewed therein. Additionally, or alternatively, the data management system 104 may parse an archive of social media mentions of items of content to generate a taxonomy of the items of content. In another example, the data management system 104 may use natural language processing for named entity extraction. For example, the data management system 104 may use natural language processing to extract named entities from title and description tags, which may facilitate information retrieval.

As an example of a set of taxonomies, as shown in FIG. 1B, the data management system 104 may receive first data identifying a first taxonomy of items of content and second data representing a second taxonomy of items of content. In this case, some portions of the first taxonomy may overlap with some portions of the second taxonomy (e.g., some data entries may be tagged with subject tags from the first taxonomy and from the second taxonomy). A first node of the first taxonomy may have an equivalence with (e.g., a threshold level of similarity, as described herein) a second node of the second taxonomy, as shown. As described in more detail herein, the data management system 104 may identify the aforementioned equivalence (or another relationship, such as a node or tag being broader than another node or tag, a node or tag being narrower than another node or tag, or a node or tag being related to another node or tag) and generate one or more relationships for a meta-taxonomy that includes information from the first taxonomy and the second taxonomy. As shown in FIG. 1B, a taxonomy may have one or more isolated clusters of nodes. For example, the "Fiction" subject in the first taxonomy may be isolated from the "Novels" subject in the second taxonomy, despite an equivalency between the "Fiction" subject and the "Novels" subject.

Figure 1C:
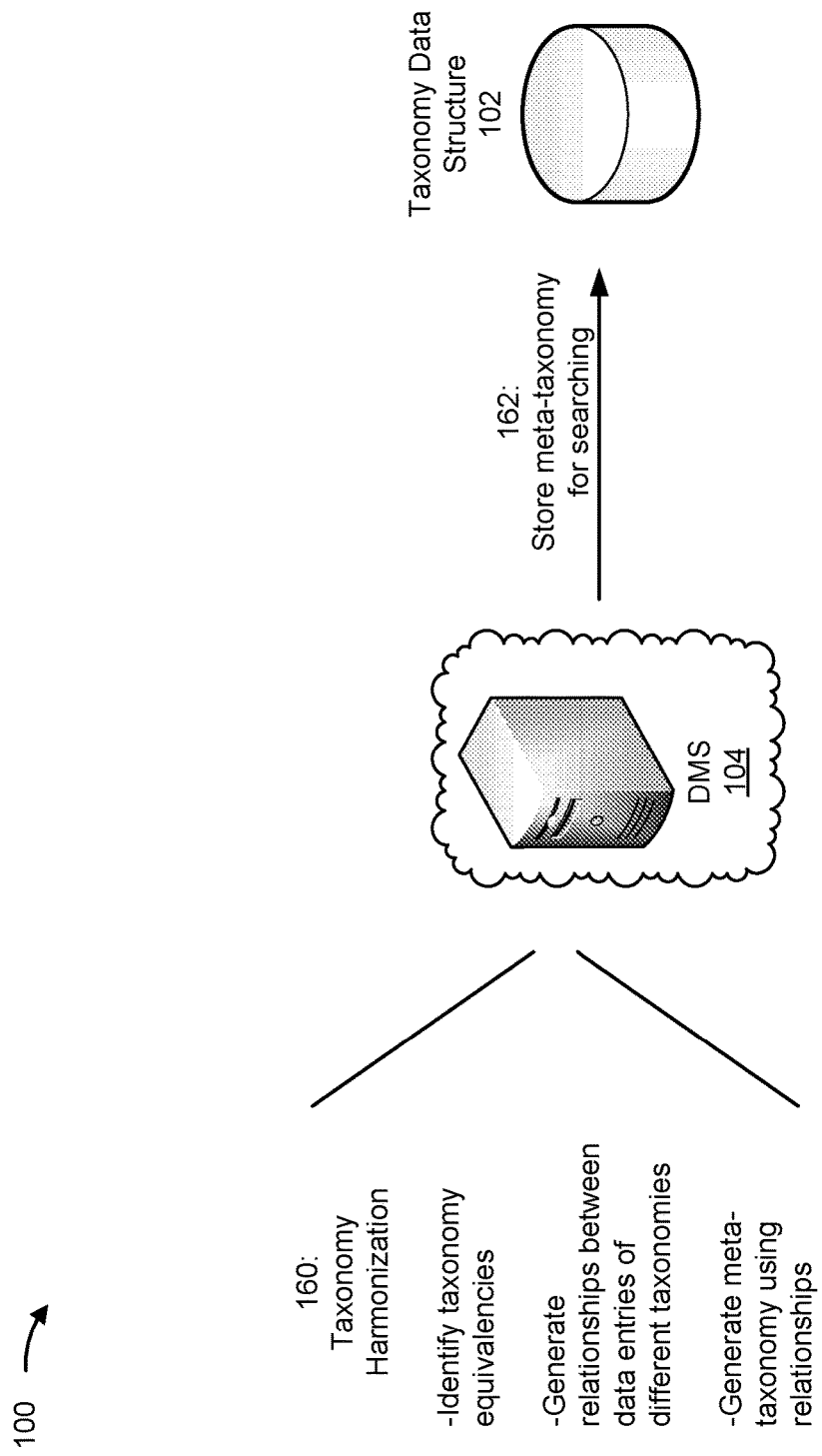

As further shown in FIG. 1C, and by reference number 160, the data management system 104 may perform a taxonomy harmonization process. For example, the data management system 104 may identify taxonomy equivalencies between different taxonomies, generate relationships between data entries of different taxonomies, or generate a meta-taxonomy using the generated relationships, among other examples. In this way, the data management system 104 may generate a meta-taxonomy and a data graph thereof representing items of content across multiple different taxonomies. By generating the meta-taxonomy, the data management system 104 enables efficient searching across the different taxonomies by generating connections between different tags to enable cross-tag searching, as described herein.

In some implementations, the data management system 104 may measure a level of equivalency to identify equivalencies (e.g., vocabulary equivalencies) between different taxonomies. For example, the data management system 104 may identify equivalent terms, such as using a Jaccard similarity measurement. In this case, the data management system 104 may determine whether there is a threshold degree of overlap between data entries tagged by vocabulary in a first taxonomy and a second taxonomy to determine whether tags on items of the first taxonomy can be applied to items of the second taxonomy and vice versa. In other words, the data management system 104 may determine that a first tag in the first taxonomy and a second tag in the second taxonomy have a threshold percentage of overlapping items tagged in each taxonomy. For example, when the first tag is assigned to a first group of items and the second tag is assigned to a second group of items, and the first group of items overlaps with the second group of items to a threshold extent (e.g., the first group of items and the second group of items include, primarily, the same items, such as the first group of items having 100 items, the second group of items having 102 items, and comparing the first group of items and the second group of items results in identifying 98 items occurring in both groups), the data management system 104 may determine that the first tag and the second tag are overlapping. In this case, the groups of items are bidirectionally overlapping.

Additionally, or alternatively, the data management system 104 may identify equivalent terms based on an overlap similarity with text-matching. For example, the data management system 104 may identify that a threshold amount of items tagged within a first taxonomy is a subset of items tagged within a second taxonomy. In other words, data management system 104 may determine that the first taxonomy is a subset of the second taxonomy and that there is a text-match between items in the first taxonomy and items in the second taxonomy. Returning the previous example, when the first tag is assigned to a first group of items (e.g., 100 items) and the second tag is assigned to a second group of items (e.g., 1000 items), a comparison of the groups of items may indicate that 98 items of the first group of items are present in the second group of items (e.g., which may be termed unidirectionally overlapping) and that a textual similarity is present between the groups of items. In this case, the data management system 104 may determine that the first tag is equivalent to the second tag (although the groups of items are not bidirectionally overlapping. In contrast, when there is not textual similarity, but there is unidirectional overlapping, the data management system 104 may determine that one tag is narrower than a second tag. For example, the data management system 104 may determine that the first tag, above, is a subset of the second tag, above. In another example, when there is not a high degree of overlapping in any directionality, but there is a high degree of textual similarity, the data management system 104 may determine that two tags are related, although not overlapping.

Additionally, or alternatively, the data management system 104 may determine whether there is overlap similarity between vocabularies of different taxonomies. For example, as described above, the data management system 104 may determine that first content tagged in a first taxonomy is a subset of second content tagged in a second taxonomy with terms of differing specificity (e.g., broader terms). Additionally, or alternatively, the data management system 104 may determine whether there is an overlap with regard to related text in different taxonomies. For example, the data management system 104 may determine that there is a text or semantic match between labels in different taxonomies (e.g., but without equivalent terms or broader terms).

In some implementations, the data management system 104 may use a harmonization model, selected based on a mapping scenario, to harmonize different taxonomies. For example, the data management system 104 may automatically identify a mapping scenario and apply a procedure and associated model based on the mapping scenario. In this case, the data management system 104 may apply a rule-based harmonization model to identify harmonization scenarios based on a threshold amount of data graph overlap between data graphs representing different taxonomies and/or based on a textual similarity between terms in the data graphs. In this case, the data graph overlap may include identified overlapping between a first data graph representing a first taxonomy and a second data graph representing a second taxonomy. The textual similarity may include an identified similarity between terms of different taxonomies, as described above.

In some implementations, the data management system 104 may create relationships for a harmonization scenario, including relationships representing equivalent terms, broader or narrower terms, related terms, or other relationships. For example, returning to FIG. 1B, the subject "Adventure stories" may be associated with the subject "Novels" according to a first relationship ("Novels" is a broader term (BT) than "Adventure stories") and a second relationship ("Adventure stories" is a narrower term (NT) than "Novels"). Similarly, the item "Riding The Tiger" may be tagged to the subject "Adventure stories", which may include a further tag to the subject "Novels", based on the first relationship. In contrast, the item "A Man Lies Dreaming" is tagged to the subject "Novels", but this does not include a further tag to the subject "Adventure stories" based on the second relationship. The data management system 104 may generate one or more of the aforementioned relationships across taxonomies rather than just within a taxonomy as may be present when the data management system 104 obtains the different taxonomies.

In some implementations, the data management system 104 may generate relationships by generating new edges and/or nodes. For example, the data management system 104 may generate a cross-taxonomy edge for a relationship tag indicating that the subject "Adventure stories" is an equivalent term to "Action and Adventure". In this case, the data management system 104 may further add cross-taxonomy edges to represent relationships between items tagged to "Adventure stories" and the equivalent term "Action and Adventure". In some implementations, the data management system 104 may use an artificial intelligence technique to identify relationships and generate edges. For example, the data management system 104 may determine that at least one item ("The Call Of The Wild") is tagged to both a first subject ("Adventure stories") and a second subject ("Nature Stories").

In some implementations, the data management system 104 may generate a meta-taxonomy. For example, the data management system 104 may generate a data graph representing relationships between different terms across multiple taxonomies. In some implementations, when the data management system 104 determines that terms within different taxonomies are equivalent, the data management system 104 may generate equivalent edges. In this way, the data management system 104 may store information more efficiently using the meta-taxonomy than is achieved by storing multiple different taxonomies without harmonization.

As further shown in FIG. 1C, and by reference number 162, the data management system 104 may store the meta-taxonomy for searching. For example, the data management system 104 may store information identifying the content data and the meta-taxonomy in a graph database. The meta-taxonomy may be represented as graph nodes and edges of a data graph in the graph database. In some implementations, the data management system 104 may store information associated with the meta-taxonomy in a format associated with efficient searching. For example, the data management system 104 may store a data graph to enable a graph-based information retrieval process (e.g., a search). Additionally, or alternatively, the data management system 104 may generate a search index of, for example, a full text of the meta-taxonomy and may store the search index. In this case, the search index may include information identifying nodes. During an information retrieval (e.g., search) process, the data management system 104 may traverse edges to retrieve relevant nodes. In other words, the data management system 104 may search the search index and identify a subject node, then may traverse equivalent edges of the subject node to retrieve content nodes identifying content to provide as search results.

Figure 1D:
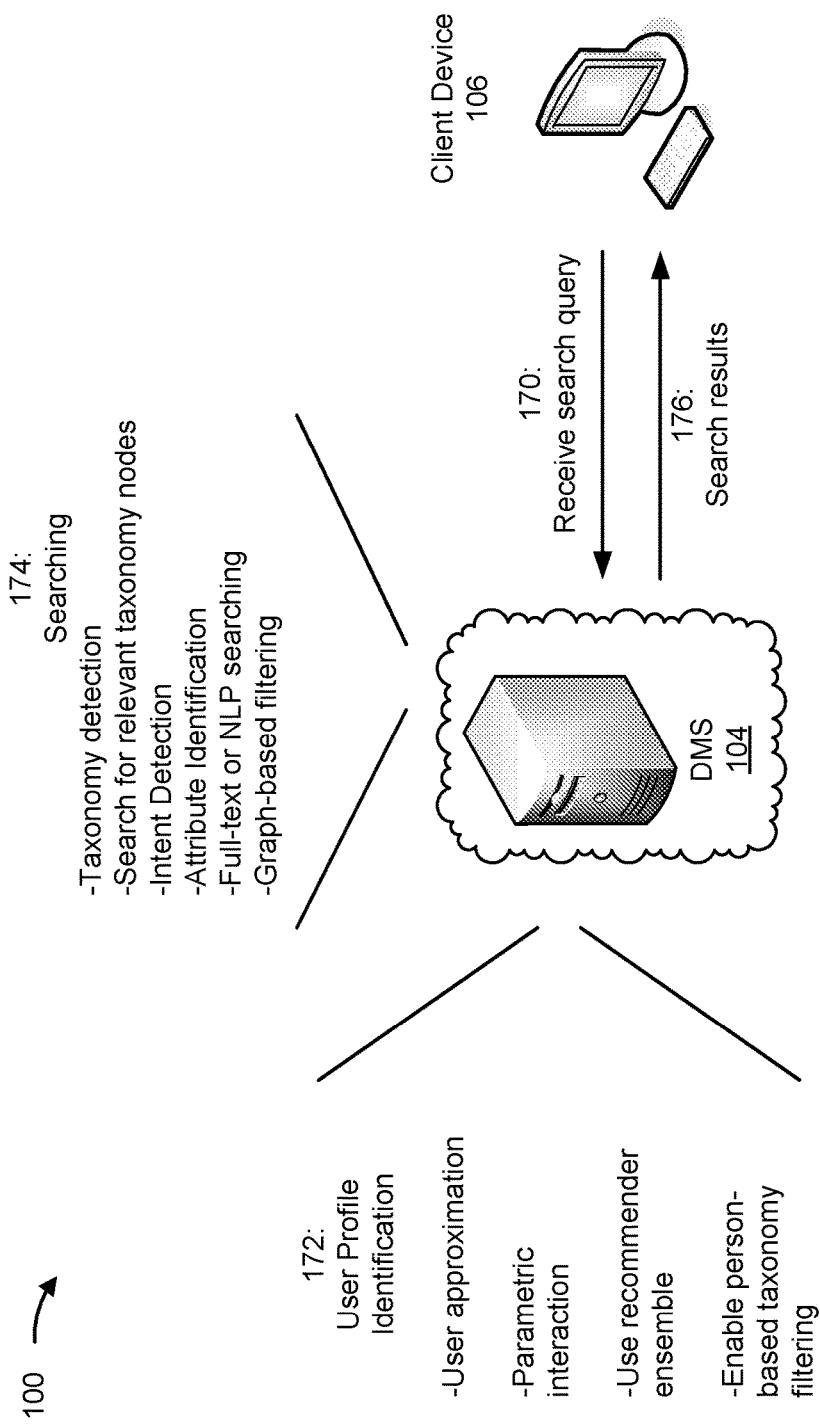

As further shown in FIG. 1D, and by reference number 170, the data management system 104 may receive a search query. For example, the data management system 104 may receive the search query from the client device 106. In this case, the search query may include a textual search query or an audio search query, among other examples.

As further shown in FIG. 1D, and by reference numbers 172 and 174, the data management system 104 may perform information retrieval. For example, the data management system 104 may perform a user profile identification process for recommendation generation. In another example, based on receiving the search query, the data management system 104 may identify search results. In a hybrid process, the data management system 104 may be configured to generate recommendations based on search results. In connection with the user profile generation process, the data management system 104 may generate data for a user profile. The user profile may include information identifying a set of historical transactions associated with a user (e.g., previous books reserved from a library, previous links interacted with from previous search results), user demographic data, or other contextual metadata (e.g., a time of the search query, a time of historical search queries, location data, or user reviews or ratings of items of content, among other examples). One example of a historical transaction is a previous search, which the data management system 104 may use to determine a recommendation in the future.

In some implementations, the data management system 104 may obtain parametric interaction data associated with a user profile. For example, the data management system 104 may obtain a knowledge graph storing information regarding historical transactions between the data management system 104 and the user of the client device 106. In this case, the information regarding the historical transactions may include items selected (e.g., books reserved), transaction recency, transaction frequency, or rating data (e.g., ratings of items or of search results), among other examples. In some implementations, the data management system 104 may weight the information regarding the historical transactions (e.g., items selected, transaction recency weighted using a decay function, etc.) with a set of weights for use in determining one or more identified items to provide to the user as a recommendation.

A recommendation may include items of content that are selected for a user based on collaborative filtering and/or content filtering. In collaborative filtering, the data management system 104 may identify a set of similar users to the user and recommend new items of content based on information associated with the set of similar users as well as a user profile for the user (e.g., past content that the user has selected). In content filtering, the data management system 104 may find top similar items of content to an item of content the user has already selected based on shared subject tags, among other examples of similarities. In a hybrid approach, a recommendation may be based on search results for the user. In other words, a search result may represent an item of content determined to have a threshold match to a search query, and the search result may be data that is included in a user profile used for generating a recommendation (e.g., an item of content selected for a user based on user profile data).

In some implementations, the data management system 104 may use a user approximation procedure to substitute for a lack of a user profile (or a portion thereof). For example, when the data management system 104 does not locate a user profile for a user, the data management system 104 may approximate a default profile or proxy profile for the user. The approximated default profile or proxy profile may include one or more default preferences (e.g., which may be based on a most-common set of preferences of other user profiles) and/or one or more automatically generated data points, such as a time of the recommendation or a location of the recommendation. Additionally, or alternatively, when the data management system 104 identifies a user profile with relatively little data (e.g., the user profile includes blank fields or a relatively short search history), the data management system 104 may approximate artificial data (proxy data) for the user profile (e.g., field entries or artificial search history). In this case, the artificial data may include data based on most-common entries for the blank field or data based on similar user profiles identified for other users (e.g., user profiles that share common field values with a user profile of the user), as described herein. As an example, for a new user, the data management system 104 may use demographic information, reading interest, and device information to similar users and use information for the similar users to generate a recommendation for the new user. In one example, the data management system 104 may group the similar users (e.g., with or without weighting) to create an average profile among the similar users and use the average profile instead of a user profile until a user profile has been generated for the new user (e.g., based on user interactions).

The data management system 104 may perform a graph-based collaborative filtering process that includes identifying an interest profile of a user from the user profile (e.g., which may include frequency percentages with which a user chooses items of content in respective categories) and identify similar interest profiles from other user profiles of other users (e.g., other users who have selected items of content from respective categories with similar frequency percentages). In this case, the data management system 104 may recommend items of content, that the user has not already selected, that other users with similar frequency percentages have previously selected.

In some implementations, the data management system 104 may generate a model of user interaction with the data management system 104. For example, the data management system 104 may use user profile information to model a user's historical interactions with the data management system 104 and predict future interactions. As an example, the data management system 104 may determine that at different times of day, the data management system 104 receives different types of search queries from the user, such as receiving search queries relating to technical books during working hours of the user and receiving search queries relating to non-technical books during non-working hours of the user. In this case, the data management system 104 may automatically predict a type of search result to provide and/or a type of searching to perform (e.g., searching for technical versus non-technical books) based on the model of the user's historical interactions, thereby reducing an amount of time to return search results by enabling the data management system 104 to pre-process the meta-taxonomy (e.g., to pre-filter non-technical books during working hours, for example).

As further shown in FIG. 1D, and by reference number 174, the data management system 104 may search for one or more search results. For example, the data management system 104 may identify the one or more search results and/or a recommendation associated therewith based on the search query and the user profile identification. In some implementations, the data management system 104 may perform a graph-based search. For example, the data management system 104 may detect a taxonomy (e.g., the meta-taxonomy) for the search query, identify a set of relevant nodes from a data graph representing the meta-taxonomy. The data management system 104 may perform semantic searching, entity boosting, popularity searching, and graph-based filtering to generate search outputs.

In some implementations, the data management system 104 may select a type of search. For example, the data management system 104 may receive a search query and determine whether a natural language processing path can be used to evaluate the search query. In some implementations, the data management system 104 may determine whether the natural language processing path can be used based on a language of the search query and/or another threshold criterion (e.g., the search query including at least a minimum quantity of nouns to use as search terms). For example, when the data management system 104 has trained a natural language processing model on a particular set of languages, the data management system 104 may apply the natural language processing model when receiving a search query detected to be associated with a language in the particular set of languages. In this case, the natural language processing path may include taxonomy filtering, intent-driven dedicated search (e.g., using the user profile), named entity recognition based boosting, and a graph-based popularity search, as described herein. In some implementations, the natural language processing path may use natural language processing techniques to identify semantically similar search results (e.g., search results with an attribute, such as a title or subject, with a semantic similarity to the search query). Alternatively, when the natural language processing path is not selected, the data management system 104 may use a full text searching path that includes full text searching and a graph-based popularity search, as described herein. In some implementations, the data management system 104 may store user feedback and use the user feedback to train the search engine to rank an order of search results, which may improve accuracy over time.

In some implementations, the data management system 104 may perform taxonomy-based filtering to identify a search result. For example, the data management system 104 may parse the search query to determine a semantic meaning of the search query and may identify one or more elements of the data graph representing the meta-taxonomy that match the semantic meaning of the search query. As an example, the data management system 104 may determine that a search query of "fictional stories about pirates" has a semantic meaning corresponding to, among other nodes in a data graph, a node representing a "fiction" subject as a root-level term. Content nodes taxonomically related to "fiction" may be identified for subsequent searching, such as a node relating to an "Action and Adventure". The data management system 104 may use intent-driven dedicated search, named entity recognition boosting, vector search, or other techniques for the subsequent searching. In some implementations, the data management system 104 may use the identified nodes to filter out data entries of the meta-taxonomy, thereby reducing an amount of data entries to search relative to performing, for example, a token-based full text search (e.g., tokenizing text for a full text search).

In some implementations, the data management system 104 may apply a prioritization to one or more attributes to identify a search result. For example, the data management system 104 parses the search query to identify an intent of a search, such as a search intent being for a particular author. In this case, the data management system 104 may apply different weightings to search results identified from different tags (e.g., weighting the "author" tag higher than other tags based on the intent of the search being for a particular author). In this case, the data management system 104 may apply a first weight to a first term "fictional stories" and a second weight to a second term "about pirates" and use the relative weightings to prioritize which items to return as results for the search query. Additionally, or alternatively, the data management system 104 may apply different weights to attributes of an item included in the meta-taxonomy. For example, the data management system 104 may apply a first weight to a subject attribute, a second weight to a title attribute, and a third weight to an author attribute. In this case, the data management system 104 may determine which search results to provide and/or an order in which to provide a set of search results based on the relative weights.

In some implementations, the data management system 104 may perform a plurality of searches using different attributes. For example, the data management system 104 may use a semantic-based query intent, derived from the search query, to perform a set of searches on a set of attributes of each item (e.g., a first search, using the query intent, applied to a subject attribute, a second search, using the query intent, applied to a title attribute, etc.). In this case, the data management system 104 may collect results from each search, of the set of searches, and merge and prioritize the results based on a relative prioritization of different attributes. For example, the data management system 104 may prioritize a title attribute or subject attribute over an author attribute for a search query with a semantic meaning relating to subject matter. In contrast, for a search query with a semantic meaning relating to a proper name, the data management system 104 may prioritize the title attribute or the author attribute over the subject attribute.

In some implementations the data management system 104 may perform search post-processing. For example, the data management system 104 may perform an ensemble search (e.g., combining search results from multiple search processes, such as graph-based searching and natural language processing based searching), promote targeted content (e.g., advertising, selected based on the search results and/or the user profile, that is inserted into the search results), and perform process filtering and formatting. In some implementations, the data management system 104 may generate a set of search results for output. For example, the data management system 104 may generate the set of search results based on search results identified from the search query. In other words, the data management system 104 may identify search results and generate a set of search results from the identified search results. The generated set of search results may include a subset of the identified search results, targeted content, or a particular type of content (e.g., images rather than textual matches), among other examples. The targeted content may include some search results that are boosted from an initial rank in the search results to a final, higher rank in the search results, based on, for example a type or other attribute of the targeted content. For example, digital content or long-tail (non-popular) content may be subject to boosting to increase a rank in the search results. In some implementations, the data management system 104 may generate the set of search results according to a template. For example, the data management system 104 may generate the set of search results according to a relevancy template (e.g., prioritizing most-relevant results), a breadth template (e.g., incorporating a greater quantity of results, including some less-relevant results than in the relevancy template, incorporating additional items of content sharing one or more tags with a top N set of results), or a recency template (e.g., incorporating most recent results), among other examples.

In some implementations, the data management system 104 may generate recommendations in connection with the search results. For example, the data management system 104 may provide search results recommended for a particular user based on an obtained user profile. Search results may also be considered user-content interaction for generating a user profile and developing a set of recommendations. In some implementations, the data management system 104 may use a recommender ensemble (e.g., multiple recommendation techniques, algorithms, or models) to generate a set of recommendations for the user based on the search query. For example, the data management system 104 may implement multiple different recommendation algorithms and apply weights to recommendations from the multiple different recommendation algorithms to select one or more recommendations to provide to client device 106 for the user. In one example, the data management system 104 may select a top N items from multiple recommendation models, algorithms, or engines as information retrieval results to provide to a user.

In some implementations, the data management system 104 may use graph-based collaborative filtering (e.g., using similarity based on similar users or transaction history) or graph-based content-based filtering (e.g., using similarity based on content metadata) for information retrieval. As described above, collaborative filtering may include identifying similar users (e.g., a time-weighted Jaccard similarity score applied to historical transactions of the user and other users to identify other top similar users and identify content selected by the other similar users). Additionally, or alternatively, the data management system 104 may identify similar interest profiles to an interest profile of the user (e.g., using a Cosine similarity metric to measure a similarity of interest profiles) and identify content selected by the other similar users. Additionally, or alternatively, for collaborative-based filtering, the data management system 104 may identify content previously selected by the user and identify a time-weighted Jaccard similarity with other users that have selected the same content to generate other recommendations based on other selections by the other users. Additionally, or alternatively, the data management system 104 may determine a Jaccard similarity of content selected by the user to other content represented in the data graph of the meta-taxonomy.

As further shown in FIG. 1D, and by reference number 176, the data management system 104 may provide information retrieval results as output. For example, the data management system 104 may provide recommendations to the client device 106. In some implementations, the data management system 104 may provide breadth-based information retrieval (e.g., recommendation results or depth-based information retrieval results. For example, using the data graph structure of the meta-taxonomy, the data management system 104 may divide identified recommendation results into breadth-based recommendation results (e.g., representing a horizontal similarity, such as having subject tags with a minimum hop distance to the subject tags of currently identified content) and depth-based recommendations (e.g., representing a vertical similarity, such as having the same or narrower subject tags compared to currently identified content). In other words, a breadth-based recommendation result may include a top result and other results that are associated with subjects that are related to the top recommendation result by a minimum quantity of hops in a data graph. In contrast, the depth-based recommendations may include a top result and other results that are associated with a narrower term than the top result in the data graph of the meta-taxonomy.

In some implementations, the data management system 104 may generate a hybrid of breadth and depth information retrieval results. For example, the data management system 104 may use a user profile to predict that a user prefers, in selecting items, a particular level of depth and a particular level of breadth, such as preferring results that achieve a particular level of depth as well as other results with a particular level of breadth at the particular level of depth. In other words, the data management system 104 may predict that a user prefers search results at a first level, second level, and third level of depth as well as additional search results from the third level of depth extending horizontally for a first level and a second level of breadth. In some implementations, the data management system 104 may provide a recommendation. For example, the data management system 104 may identify a search result that is recommended based on a match to the search query and based on a match to a user profile, as described above.

In some implementations, the client device 106 may provide the search results for display. For example, the client device 106 may provide a user interface in which the search results are included on a display screen of the client device 106. In this case, the user can interact with the user interface to select a search result and receive additional information regarding the search result. In some implementations, the client device 106 may provide feedback to the data management system 104. For example, the client device 106 may indicate a selection of a search result, which the data management system 104 may use to retrain and/or refine one or more models described herein and/or update a user profile described herein.

As indicated above, FIGS. 1A-1D are provided as an example. Other examples may differ from what is described with regard to FIGS. 1A-1D. The number and arrangement of devices shown in FIGS. 1A-1D are provided as an example. In practice, there may be additional devices, fewer devices, different devices, or differently arranged devices than those shown in FIGS. 1A-1D. Furthermore, two or more devices shown in FIGS. 1A-1D may be implemented within a single device, or a single device shown in FIGS. 1A-1D may be implemented as multiple, distributed devices. Additionally, or alternatively, a set of devices (e.g., one or more devices) shown in FIGS. 1A-1D may perform one or more functions described as being performed by another set of devices shown in FIGS. 1A-1D. Although some implementations are described in terms of books, it is contemplated that implementations described herein may apply to other content, such as video content, textual content other than books, or audio content, among other examples.

Figure 2:
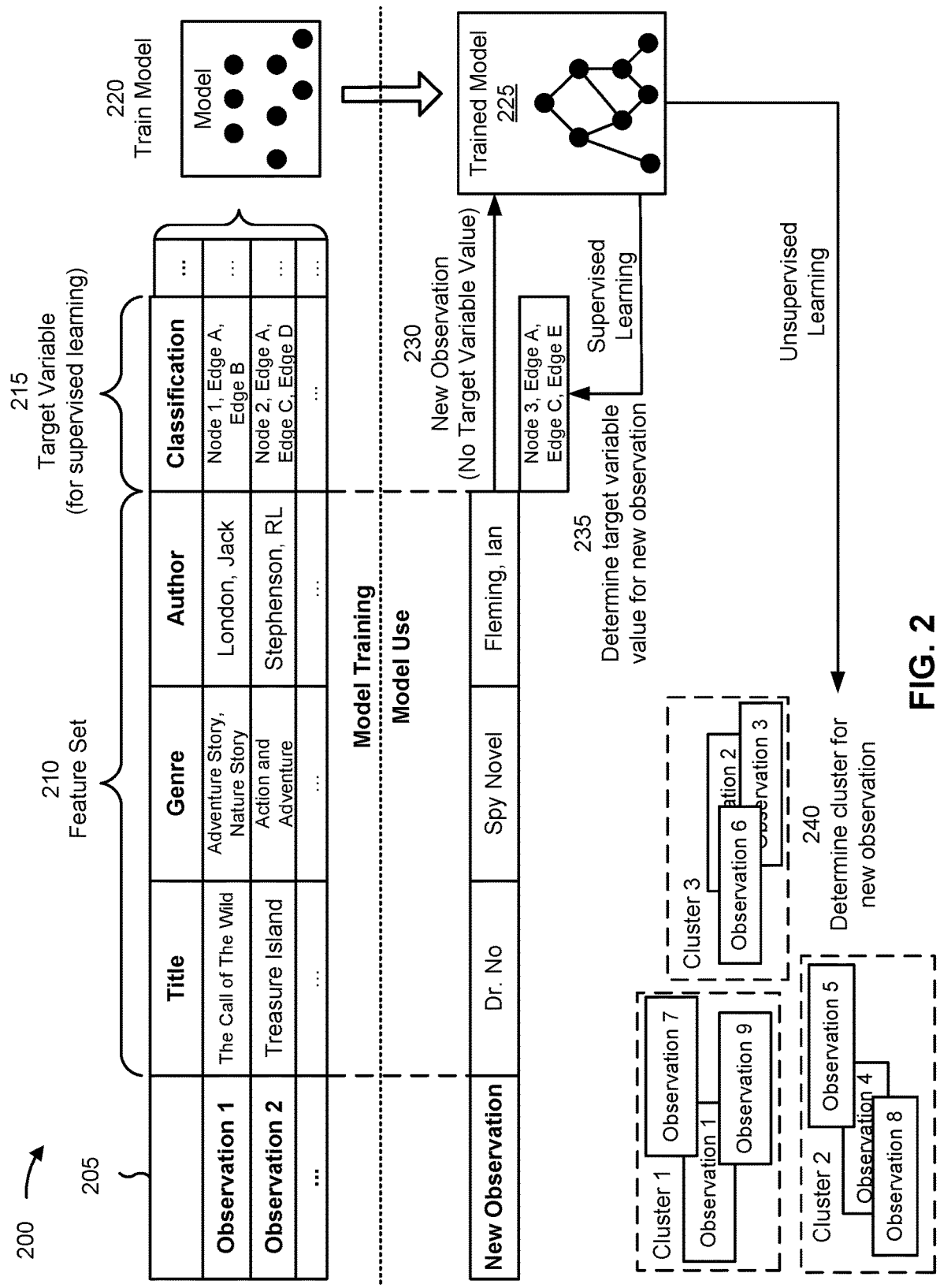
FIG. 2 is a diagram illustrating an example of training and using a machine learning model in connection with an efficient data storage and retrieval system.

FIG. 2 is a diagram illustrating an example 200 of training and using a machine learning model in connection with an efficient data storage and retrieval system. The machine learning model training and usage described herein may be performed using a machine learning system. The machine learning system may include or may be included in a computing device, a server, a cloud computing environment, or the like, such as the data management system 104 or the data management system 301 described in more detail elsewhere herein.

As shown by reference number 205, a machine learning model may be trained using a set of observations. The set of observations may be obtained from training data (e.g., historical data), such as data gathered during one or more processes described herein. In some implementations, the machine learning system may receive the set of observations (e.g., as input) from one or more taxonomy data systems 330, as described elsewhere herein.

As shown by reference number 210, the set of observations may include a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the one or more taxonomy data systems 330. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of a title (e.g., a title of an item of content), a second feature of a subject (e.g., a first taxonomic classification of the item of content), a third feature of an author (e.g., a second taxonomic classification of the item of content), and so on. As shown, for a first observation, the first feature may have a value of "The Call of The Wild", the second feature may have a value of "Adventure Story" and "Nature Story", the third feature may have a value of "London, Jack", and so on. These features and feature values are provided as examples, and may differ in other examples. For example, the feature set may include one or more of the following features: "subject", "date of publication", "type of media", or "user rating", among other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 200, the target variable is a classification, which has a value of a particular set of nodes and edges (Node 1, Edge A, Edge B) for the first observation.

The feature set and target variable described above are provided as examples, and other examples may differ from what is described above. For example, for a target variable of a recommendation, the feature set may include the aforementioned features as well as past recommendations, past user evaluations of past recommendations, or a user profile, among other examples.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. For example, the machine learning system may train a k-nearest neighbor algorithm to enable identification of related items of content in a catalog, thereby enabling improved recommendations from the catalog. As another example, the machine learning system may train a neural network algorithm to make recommendations of items of content, in response to a search query, from the catalog based on relationships identified between items in the catalog. After training, the machine learning system may store the machine learning model as a trained machine learning model 225 to be used to analyze new observations.

As an example, the machine learning system may obtain training data for the set of observations based on one or more classifications or taxonomies for a catalog of data entries. For example, the machine learning system may obtain a first taxonomy from a library catalog, a second taxonomy from a commercial bookstore, a third taxonomy from a website tracking books that readers have completed, or a fourth taxonomy from a set of book reviews published by a periodical, among other examples. Each of the aforementioned taxonomies may have different attributes tagged to the same content items. For example, a library catalog may tag a book as being in an "Action and Adventure" subject and a periodical publishing revise may tag a book as being in an "Adventure stories" subject. The machine learning system may analyze many different features to determine whether to, for example, identify an equivalency or relationship between the "Action and Adventure" subject and the "Adventure stories" subject (for example, an equivalency with the "Adventure stories" subject may be present for books in the "Action and Adventure" subject but not for movies in the "Action and Adventure" subject).

In this case, the machine learning system may apply attributes to items of content that the items of content were not already tagged with, thereby generating a meta-taxonomy. For example, a book in the "Adventure stories" subject may be tagged with an "Action and Adventure" subject tag. Moreover, other tags may be contextually applies, such as applying a "Fiction" tag to an "Adventure stories" book based on the "Fiction" tag being related to the "Action and Adventure" tag. Based on the meta-taxonomy, the machine learning system may generate a data graph of nodes and edges to connect different data entries in the meta-taxonomy, thereby enabling efficient searching of the meta-taxonomy based on relationships between different items.

As shown by reference number 230, the machine learning system may apply the trained machine learning model 225 to a new observation, such as by receiving a new observation and inputting the new observation to the trained machine learning model 225. As shown, the new observation may include a first feature of "Dr. No," a second feature of "Spy Novel", a third feature of "Fleming, Ian", and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 225 may predict a value of a third set of nodes and edges (Node 3, Edge A, Edge C, Edge E) for the target variable of a classification for the new observation, as shown by reference number 235. Based on this prediction, the machine learning system may provide a first recommendation, may provide output for determination of a first recommendation, may perform a first automated action, and/or may cause a first automated action to be performed (e.g., by instructing another device to perform the automated action), among other examples. The first recommendation may include, for example, recommending the book "Dr. No" to a user searching for "Adventure stories". The first automated action may include, for example, providing the recommendation, generating search results, reserving a copy of the recommended book in a digital reservation system, or automatically shipping a copy of the recommended book to a user.

As another example, if the machine learning system were to predict a value of a different set of nodes and edges for the target variable of a classification, then the machine learning system may provide a second (e.g., different) recommendation (e.g., that the book "Dr. No" not be included in a set of search results for the aforementioned search query) and/or may perform or cause performance of a second (e.g., different) automated action (e.g., generation of a different set of search results and/or automatic reservation of a different book).

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., a first subject), then the machine learning system may provide a first recommendation, such as the first recommendation described above. Additionally, or alternatively, the machine learning system may perform a first automated action and/or may cause a first automated action to be performed (e.g., by instructing another device to perform the automated action) based on classifying the new observation in the first cluster, such as the first automated action described above.

As another example, if the machine learning system were to classify the new observation in a second cluster (e.g., a second subject), then the machine learning system may provide a second (e.g., different) recommendation and/or may perform or cause performance of a second (e.g., different) automated action.

In some implementations, the recommendation and/or the automated action associated with the new observation may be based on a target variable value having a particular label (e.g., classification or categorization), may be based on whether a target variable value satisfies one or more threshold (e.g., whether the target variable value is greater than a threshold, is less than a threshold, is equal to a threshold, falls within a range of threshold values, or the like), and/or may be based on a cluster in which the new observation is classified.

In some implementations, the trained machine learning model 225 may be re-trained using feedback information. For example, feedback may be provided to the machine learning model. The feedback may be associated with actions performed based on the recommendations provided by the trained machine learning model 225 and/or automated actions performed, or caused, by the trained machine learning model 225. In other words, the recommendations and/or actions output by the trained machine learning model 225 may be used as inputs to re-train the machine learning model (e.g., a feedback loop may be used to train and/or update the machine learning model). For example, the feedback information may include user ratings of search results and/or of recommended items (e.g., a book rating).

In this way, the machine learning system may apply a rigorous and automated process to generate recommendations and store data via a data graph for efficient retrieval. The machine learning system may enable recognition and/or identification of tens, hundreds, thousands, or millions of features and/or feature values for tens, hundreds, thousands, or millions of observations, thereby increasing accuracy and consistency and reducing delay associated with information retrieval, data categorization, and/or recommendation generation relative to requiring computing resources to be allocated for tens, hundreds, or thousands of operators to manually merge different taxonomies using the features or feature values.

As indicated above, FIG. 2 is provided as an example. Other examples may differ from what is described in connection with FIG. 2.

Figure 3:
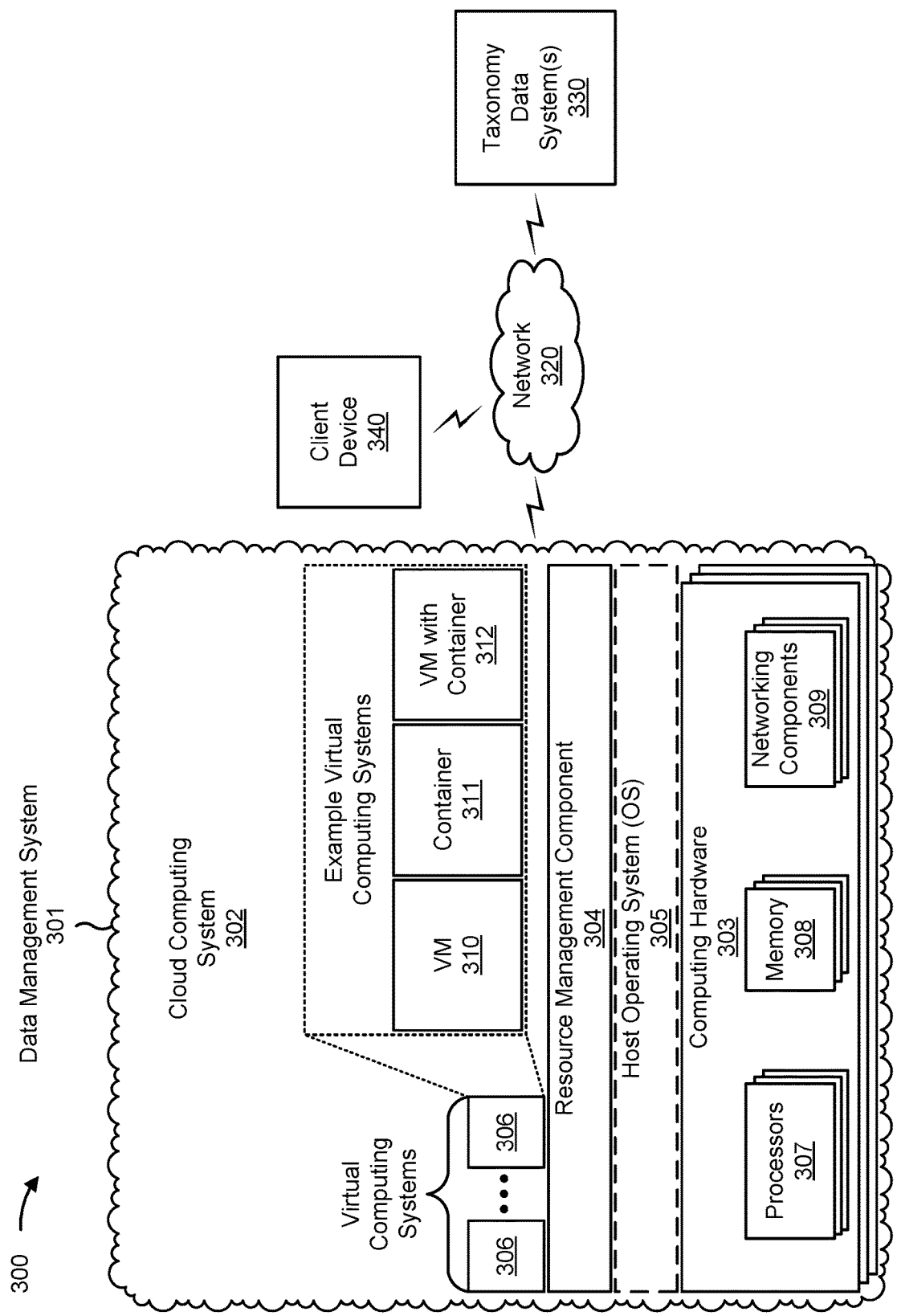
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a data management system 301 (e.g., the data management system 104), which may include one or more elements of and/or may execute within a cloud computing system 302. The cloud computing system 302 may include one or more elements 303-312, as described in more detail below. As further shown in FIG. 3, environment 300 may include a network 320, a taxonomy data system 330, and/or a client device 340. Devices and/or elements of environment 300 may interconnect via wired connections and/or wireless connections.

The cloud computing system 302 may include computing hardware 303, a resource management component 304, a host operating system (OS) 305, and/or one or more virtual computing systems 306. The cloud computing system 302 may execute on, for example, an Amazon Web Services platform, a Microsoft Azure platform, or a Snowflake platform. The resource management component 304 may perform virtualization (e.g., abstraction) of computing hardware 303 to create the one or more virtual computing systems 306. Using virtualization, the resource management component 304 enables a single computing device (e.g., a computer or a server) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

The computing hardware 303 may include hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, and/or one or more networking components 309. Examples of a processor, a memory, and a networking component (e.g., a communication component) are described elsewhere herein.

The resource management component 304 may include a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, or another type of hypervisor) or a virtual machine monitor, such as when the virtual computing systems 306 are virtual machines 310. Additionally, or alternatively, the resource management component 304 may include a container manager, such as when the virtual computing systems 306 are containers 311. In some implementations, the resource management component 304 executes within and/or in coordination with a host operating system 305.

A virtual computing system 306 may include a virtual environment that enables cloud-based execution of operations and/or processes described herein using computing hardware 303. As shown, a virtual computing system 306 may include a virtual machine 310, a container 311, or a hybrid environment 312 that includes a virtual machine and a container, among other examples. A virtual computing system 306 may execute one or more applications using a file system that includes binary files, software libraries, and/or other resources required to execute applications on a guest operating system (e.g., within the virtual computing system 306) or the host operating system 305.

Although the data management system 301 may include one or more elements 303-312 of the cloud computing system 302, may execute within the cloud computing system 302, and/or may be hosted within the cloud computing system 302, in some implementations, the data management system 301 may not be cloud-based (e.g., may be implemented outside of a cloud computing system) or may be partially cloud-based. For example, the data management system 301 may include one or more devices that are not part of the cloud computing system 302, such as device 400 of FIG. 4, which may include a standalone server or another type of computing device. The data management system 301 may perform one or more operations and/or processes described in more detail elsewhere herein.

The network 320 may include one or more wired and/or wireless networks. For example, the network 320 may include a cellular network, a public land mobile network (PLMN), a local area network (LAN), a wide area network (WAN), a private network, the Internet, and/or a combination of these or other types of networks. The network 320 enables communication among the devices of the environment 300.

The one or more taxonomy data systems 330 may include one or more devices capable of receiving, generating, storing, processing, and/or providing information associated with an efficient data storage and retrieval system, as described elsewhere herein. The taxonomy data systems 330 may include a communication device and/or a computing device. For example, the taxonomy data systems 330 may include a database, a server, a database server, an application server, a client server, a web server, a host server, a virtual server (e.g., executing on computing hardware), a server in a cloud computing system, a device that includes computing hardware used in a cloud computing environment, or a similar type of device. The taxonomy data systems 330 may communicate with one or more other devices of environment 300, as described elsewhere herein.

The client device 340 may include one or more devices capable of receiving, generating, storing, processing, and/or providing information associated with an efficient data storage and retrieval system, as described elsewhere herein. The client device 340 may include a communication device and/or a computing device. For example, the client device 340 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment 300 may perform one or more functions described as being performed by another set of devices of the environment 300.

Figure 4:
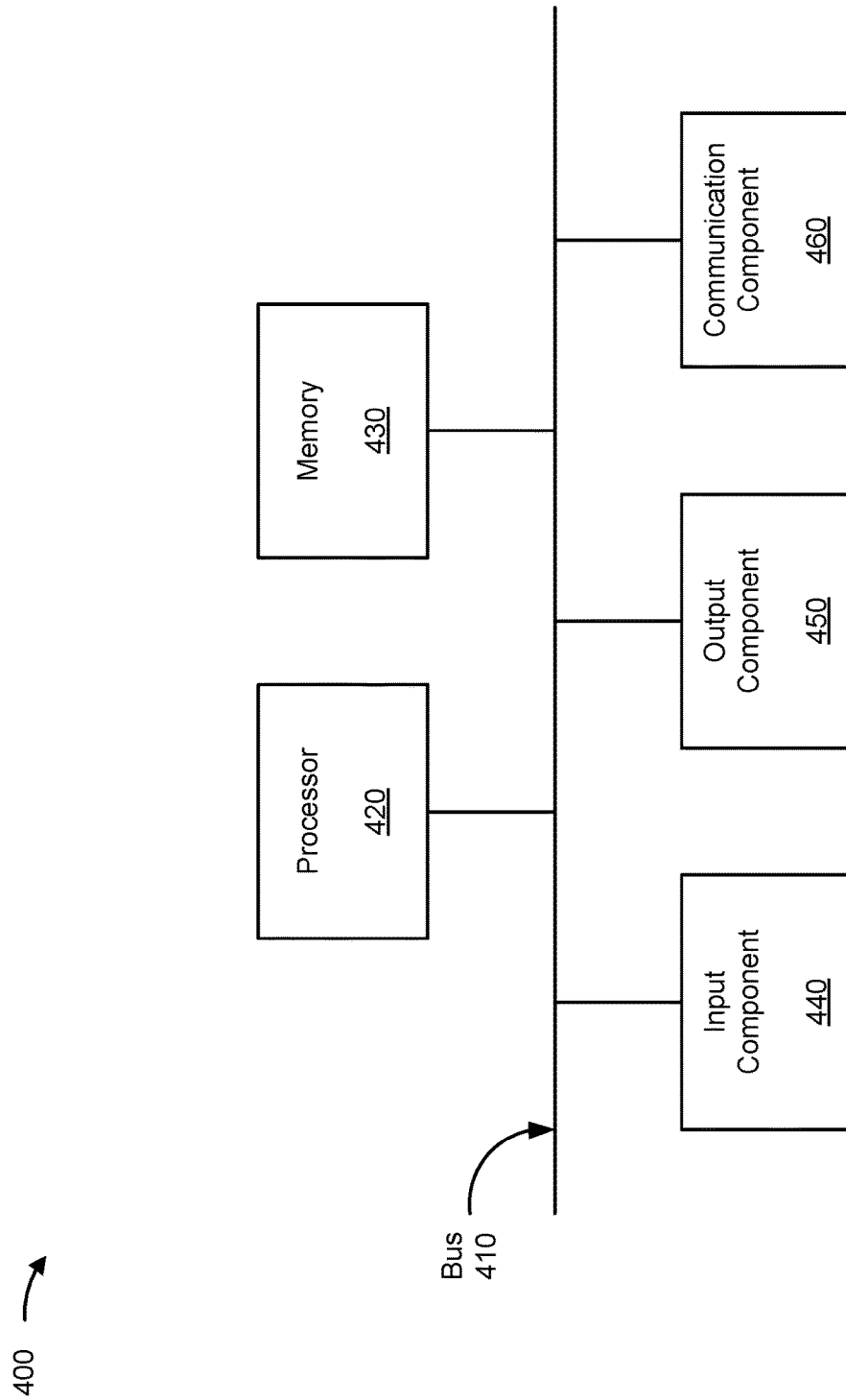
FIG. 4 is a diagram of example components of a device associated with an efficient data storage and retrieval system.

FIG. 4 is a diagram of example components of a device 400 associated with an efficient data storage and retrieval system. The device 400 may correspond to data management system 301, the one or more taxonomy data systems 330, and/or client device 340. In some implementations, data management system 301, the one or more taxonomy data systems 330, and/or client device 340 may include one or more devices 400 and/or one or more components of the device 400. As shown in FIG. 4, the device 400 may include a bus 410, a processor 420, a memory 430, an input component 440, an output component 450, and/or a communication component 460.

The bus 410 may include one or more components that enable wired and/or wireless communication among the components of the device 400. The bus 410 may couple together two or more components of FIG. 4, such as via operative coupling, communicative coupling, electronic coupling, and/or electric coupling. For example, the bus 410 may include an electrical connection (e.g., a wire, a trace, and/or a lead) and/or a wireless bus. The processor 420 may include a central processing unit, a graphics processing unit, a microprocessor, a controller, a microcontroller, a digital signal processor, a field-programmable gate array, an application-specific integrated circuit, and/or another type of processing component. The processor 420 may be implemented in hardware, firmware, or a combination of hardware and software. In some implementations, the processor 420 may include one or more processors capable of being programmed to perform one or more operations or processes described elsewhere herein.

The memory 430 may include volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 may store information, one or more instructions, and/or software (e.g., one or more software applications) related to the operation of the device 400. In some implementations, the memory 430 may include one or more memories that are coupled (e.g., communicatively coupled) to one or more processors (e.g., processor 420), such as via the bus 410. Communicative coupling between a processor 420 and a memory 430 may enable the processor 420 to read and/or process information stored in the memory 430 and/or to store information in the memory 430.

The input component 440 may enable the device 400 to receive input, such as user input and/or sensed input. For example, the input component 440 may include a touch screen, a keyboard, a keypad, a mouse, a button, a microphone, a switch, a sensor, a global positioning system sensor, an accelerometer, a gyroscope, and/or an actuator. The output component 450 may enable the device 400 to provide output, such as via a display, a speaker, and/or a light-emitting diode. The communication component 460 may enable the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
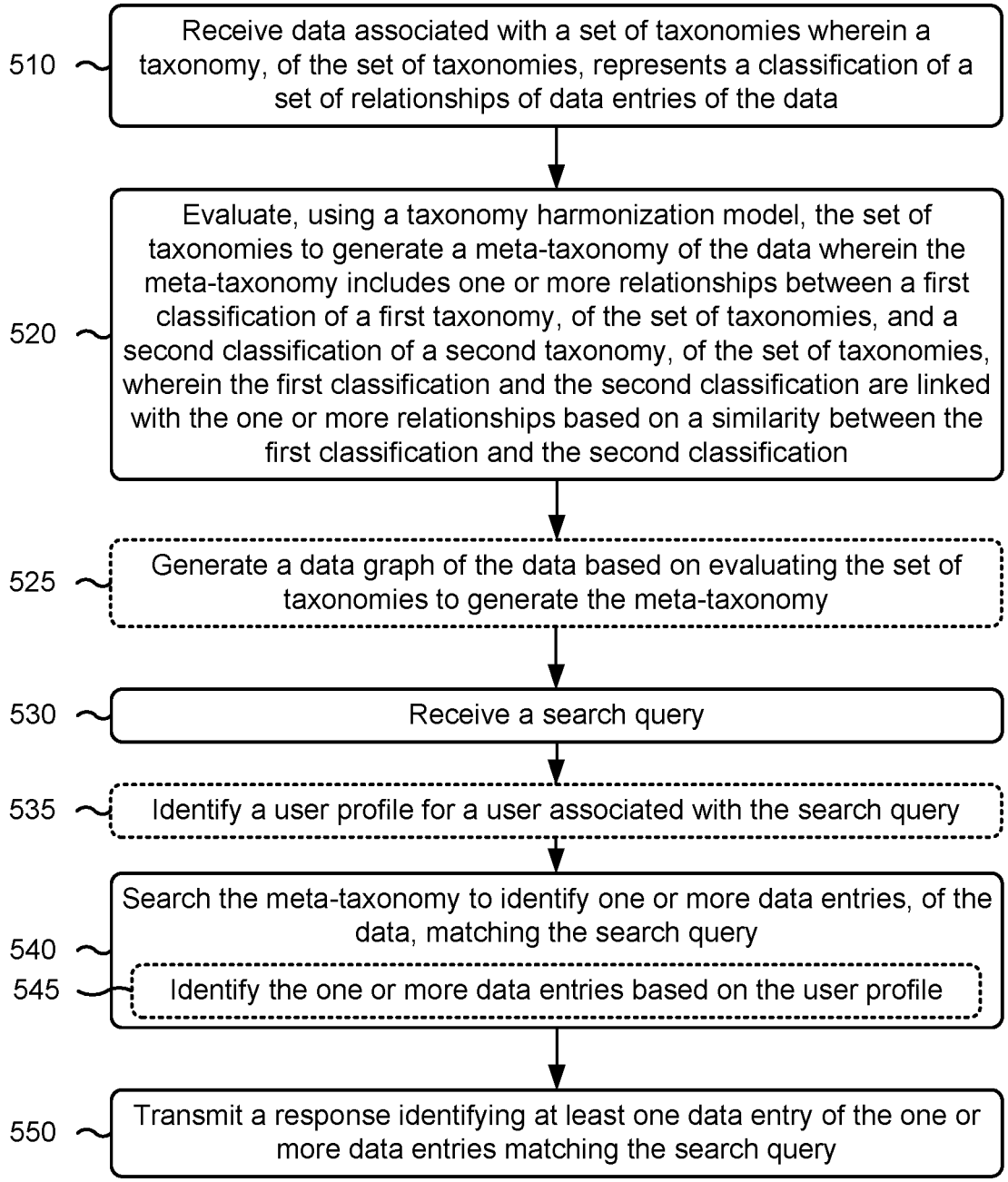
FIG. 5 is a flowchart of an example process associated with using an efficient data storage and retrieval system.

FIG. 5 is a flowchart of an example process 500 associated with using an efficient data storage and retrieval system. In some implementations, one or more process blocks of FIG. 5 are performed by a device (e.g., data management system 104, data management system 301). In some implementations, one or more process blocks of FIG. 5 are performed by another device or a group of devices separate from or including the device, such as a taxonomy data system (e.g., the one or more taxonomy data systems 330), and/or a client device (e.g., client device 340). Additionally, or alternatively, one or more process blocks of FIG. 5 may be performed by one or more components of device 400, such as processor 420, memory 430, input component 440, output component 450, and/or communication component 460.

As shown in FIG. 5, process 500 may include receiving data associated with a set of taxonomies, wherein a taxonomy, of the set of taxonomies, represents a classification of a set of relationships of data entries of the data (block 510). For example, the device may receive data associated with a set of taxonomies, as described above. In some implementations, a taxonomy, of the set of taxonomies, represents a classification of a set of relationships of data entries of the data.

As further shown in FIG. 5, process 500 may include evaluating, using a taxonomy harmonization model, the set of taxonomies to generate a meta-taxonomy of the data, wherein the meta-taxonomy includes one or more relationships between a first classification of a first taxonomy, of the set of taxonomies, and a second classification of a second taxonomy, of the set of taxonomies, wherein the first classification and the second classification are linked with the one or more relationships based on a similarity between the first classification and the second classification (block 520). For example, the device may evaluate, using a taxonomy harmonization model, the set of taxonomies to generate a meta-taxonomy of the data, as described above. In some implementations, the meta-taxonomy includes one or more relationships between a first classification of a first taxonomy, of the set of taxonomies, and a second classification of a second taxonomy, of the set of taxonomies, wherein the first classification and the second classification are linked with the one or more relationships based on a similarity between the first classification and the second classification.

As further shown in FIG. 5, in some implementations, process 500 may include generating a data graph of the data based on evaluating the set of taxonomies to generate the meta-taxonomy (block 525). For example, the device may generate the data graph of the data based on evaluating the set of taxonomies to generate the meta-taxonomy, as described above.

As further shown in FIG. 5, process 500 may include receiving a search query (block 530). For example, the device may receive a search query, as described above.

As further shown in FIG. 5, in some implementations, process 500 may include identifying a user profile for a user associated with the search query (block 535). For example, the device may identify the user profile for the user associated with the search query, as described above.

As further shown in FIG. 5, process 500 may include searching the meta-taxonomy to identify one or more data entries, of the data, matching the search query (block 540). For example, the device may search the meta-taxonomy to identify one or more data entries, of the data, matching the search query, as described above.

As further shown in FIG. 5, in some implementations, process 500 may include identify the one or more data entries based on the user profile (block 545). For example, the device may identify the one or more data entries based on the user profile, as described above.

As further shown in FIG. 5, process 500 may include transmitting a response identifying at least one data entry of the one or more data entries matching the search query (block 550). For example, the device may transmit a response identifying at least one data entry of the one or more data entries matching the search query, as described above.

Process 500 may include additional implementations, such as any single implementation or any combination of implementations described below and/or in connection with one or more other processes described elsewhere herein.

In a first implementation, evaluating the set of taxonomies comprises evaluating the set of taxonomies using a Jaccard similarity technique to identify overlapping taxonomical tagging, and generating the meta-taxonomy with the one or more relationships based on the overlapping taxonomical tagging.

In a second implementation, alone or in combination with the first implementation, evaluating the set of taxonomies comprises evaluating the set of taxonomies using an overlap similarity technique to identify an overlapping text-match between a first term of the first classification and a second term of the second classification, and generating the meta-taxonomy with the one or more relationships based on the overlapping text-match.

In a third implementation, alone or in combination with one or more of the first and second implementations, evaluating the set of taxonomies comprises evaluating the set of taxonomies using an overlap similarity technique to identify overlapping without a text-match between a first term of the first classification and a second term of the second classification, such that the second classification is at least partially a subset of the first classification, and generating the meta-taxonomy with the one or more relationships based on the overlapping without the text-match.

In a fourth implementation, alone or in combination with one or more of the first through third implementations, evaluating the set of taxonomies comprises evaluating the set of taxonomies using a semantic similarity technique to identify a term-match between a first semantic meaning of a first term of the first classification and a second semantic meaning of a second term of the second classification, and generating the meta-taxonomy with the one or more relationships based on the term-match.

In a fifth implementation, alone or in combination with one or more of the first through fourth implementations, process 500 includes generating a data graph of the data based on evaluating the set of taxonomies to generate the meta-taxonomy, wherein the data graph is based on a graph-based search model that is associated with at least one of taxonomy-based filtering, metadata attribute prioritization, or semantic matching.

In a sixth implementation, alone or in combination with one or more of the first through fifth implementations, searching the meta-taxonomy comprises detecting a particular taxonomy relating to the search query, searching the data graph of the meta-taxonomy for one or more taxonomy nodes associated with the particular taxonomy, and identifying the one or more data entries matching the search query based on the one or more taxonomy nodes associated with the particular taxonomy.

In a seventh implementation, alone or in combination with one or more of the first through sixth implementations, searching the meta-taxonomy comprises applying a natural language processing model to the data graph to prioritize a set of data entries identified from the meta-taxonomy as potential matches for the search query, and identifying the one or more data entries matching the search query based on the prioritization of the set of data entries.

In an eighth implementation, alone or in combination with one or more of the first through seventh implementations, searching the meta-taxonomy comprises identifying the one or more data entries matching the search query, and ordering the one or more data entries matching the query based on at least one of a semantic meaning technique, an entity boosting technique, a popularity search technique, or a graph-based filtering technique.

In a ninth implementation, alone or in combination with one or more of the first through eighth implementations, searching the meta-taxonomy comprises identifying a search intent based on the search query, generating a set of attributes based on the search intent, and identifying the one or more data entries matching the search query based on the set of attributes.

In a tenth implementation, alone or in combination with one or more of the first through ninth implementations, searching the meta-taxonomy comprises searching the meta-taxonomy using a vector search technique applied to the data graph.

In an eleventh implementation, alone or in combination with one or more of the first through tenth implementations, the data graph is an edge graph, and wherein the one or more relationships are represented by one or more edges between a set of nodes corresponding to the first classification and the second classification.

In a twelfth implementation, alone or in combination with one or more of the first through eleventh implementations, searching the meta-taxonomy comprises determining whether the search query satisfies a natural language processing feasibility criterion, and applying a natural language processing searching technique or a full text searching technique based on whether the search query satisfies the natural language processing feasibility criterion.

In a thirteenth implementation, alone or in combination with one or more of the first through twelfth implementations, the natural language processing feasibility criterion is based on in which language the search query is provided.

In a fourteenth implementation, alone or in combination with one or more of the first through thirteenth implementations, the natural language processing searching technique includes at least one of taxonomy filtering, intent-driven dedicated search, natural language processing boosting, or graph-based popularity searching.

In a fifteenth implementation, alone or in combination with one or more of the first through fourteenth implementations, the full text searching technique includes at least one of full text searching or graph-based popularity searching.

In a sixteenth implementation, alone or in combination with one or more of the first through fifteenth implementations, process 500 includes identifying a user profile for a user associated with the search query, and wherein searching the meta-taxonomy to identify the one or more data entries matching the search query comprises identifying the one or more data entries matching the search query based on the user profile.

In a seventeenth implementation, alone or in combination with one or more of the first through sixteenth implementations, identifying the user profile comprises receiving information identifying a user preference, identifying a set of other user profiles associated with other users based on the user preference, and importing one or more other user preferences of the set of other user profiles into the user profile for the user.

In an eighteenth implementation, alone or in combination with one or more of the first through seventeenth implementations, identifying the user profile comprises identifying a knowledge graph representing a set of historical transactions associated with the user, wherein the knowledge graph includes a set of weightings relating to at least one of a recency, a frequency, or a rating of a historical transaction of the set of historical transactions.

In a nineteenth implementation, alone or in combination with one or more of the first through eighteenth implementations, process 500 includes generating a search model based on the user profile, wherein the search model represents a set of user preferences, from the user profile, for search results, and wherein identifying the one or more data entries matching the search query comprises identifying the one or more data entries matching the search query based on the search model.

Although FIG. 5 shows example blocks of process 500, in some implementations, process 500 includes additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A device, comprising:
   one or more memories; and
   one or more processors, communicatively coupled to the one or more memories, configured to:
      receive data associated with a set of taxonomies,
         wherein a taxonomy, of the set of taxonomies, represents a classification of a set of relationships of data entries of the data;
      integrate, using a taxonomy harmonization model, the set of taxonomies to generate a meta-taxonomy of the data,
         wherein the meta-taxonomy includes one or more relationships between a first classification of a first taxonomy, of the set of taxonomies, and a second classification of a second taxonomy, of the set of taxonomies,
            wherein the first classification and the second classification are linked with the one or more relationships based on a similarity between the first classification and the second classification;
      receive a search query;
      search, by the device and using the meta-taxonomy, the data to identify one or more data entries, of the data, matching the search query; and
      transmit, by the device, a response identifying at least one data entry of the one or more data entries matching the search query.

2. The device of claim 1, wherein the one or more processors, when searching the data, are configured to:
   perform taxonomy filtering, using the meta-taxonomy, to identify a subset of the data to search; and
   search the subset of the data to identify the one or more data entries.

3. The device of claim 1, wherein the one or more processors, when searching the data, are configured to:
   search a set of contextual tags to identify the one or more data entries.

4. The device of claim 1, wherein the one or more processors, when integrating the set of taxonomies, are configured to:
   integrate the set of taxonomies using a Jaccard similarity technique to identify overlapping taxonomical tagging; and
   generate the meta-taxonomy with the one or more relationships based on the overlapping taxonomical tagging.

5. The device of claim 1, wherein the one or more processors, when integrating the set of taxonomies, are configured to:
   integrate the set of taxonomies using an overlap similarity technique to identify an overlapping text-match between a first term of the first classification and a second term of the second classification; and
   generate the meta-taxonomy with the one or more relationships based on the overlapping text-match.

6. The device of claim 1, wherein the one or more processors, when integrating the set of taxonomies, are configured to:
   integrate the set of taxonomies using an overlap similarity technique to identify overlapping without a text-match between a first term of the first classification and a second term of the second classification, such that the second classification is at least partially a subset of the first classification; and
   generate the meta-taxonomy with the one or more relationships based on the overlapping without the text-match.

7. The device of claim 1, wherein the one or more processors, when integrating the set of taxonomies, are configured to:
   integrate the set of taxonomies using a semantic similarity technique to identify a term-match between a first semantic meaning of a first term of the first classification and a second semantic meaning of a second term of the second classification; and
   generate the meta-taxonomy with the one or more relationships based on the term-match.

8. A method, comprising:
   receiving, by a device, data associated with a set of taxonomies,
      wherein a taxonomy, of the set of taxonomies, represents a classification of a set of relationships of data entries of the data;
   integrating, by the device and using a taxonomy harmonization model, the set of taxonomies to generate a meta-taxonomy of the data,
      wherein the meta-taxonomy includes one or more relationships between a first classification of a first taxonomy, of the set of taxonomies, and a second classification of a second taxonomy, of the set of taxonomies,
         wherein the first classification and the second classification are linked with the one or more relationships based on a similarity between the first classification and the second classification;
   generating, by the device, a data graph of the data based on integrating the set of taxonomies to generate the meta-taxonomy, wherein the data graph is based on a graph-based search model that is associated with at least one of: taxonomy-based filtering, metadata attribute prioritization, or semantic matching; and storing the data graph.

9. The method of claim 8, further comprising:

searching the meta-taxonomy to detect a particular taxonomy relating to a search query;

searching the data graph of the meta-taxonomy for one or more taxonomy nodes associated with the particular taxonomy; and identifying one or more data entries matching the search query based on the one or more taxonomy nodes associated with the particular taxonomy; and providing an output based on the one or more data entries.

10. The method of claim 8, wherein searching the meta-taxonomy comprises:

applying a natural language processing model to the data graph to prioritize a set of data entries identified from the meta-taxonomy as potential matches for a search query; and identifying one or more data entries matching a search query based on the prioritization of the set of data entries.

11. The method of claim 8, further comprising:

searching the meta-taxonomy to identify one or more data entries matching a search query; and outputting the one or more data entries in an order based on at least one of:

a semantic meaning technique, an entity boosting technique, a popularity search technique, or a graph-based filtering technique.

12. The method of claim 8, further comprising:

searching the meta-taxonomy to identify a search intent based on a search query;

generating a set of attributes based on the search intent; and identifying one or more data entries matching the search query based on the set of attributes; and providing an output based on the one or more data entries.

13. The method of claim 8, further comprising:

searching the meta-taxonomy using a vector search technique applied to the data graph; and providing an output based on searching the meta-taxonomy using the vector search technique.

14. The method of claim 8, wherein further comprising:

determining whether a search query satisfies a natural language processing feasibility criterion; and applying a natural language processing searching technique or a full text searching technique based on whether the search query satisfies the natural language processing feasibility criterion.

15. The method of claim 14, wherein the natural language processing feasibility criterion is based on at least one of: in which language the search query is provided or a quantity of nouns in the search query.

16. The method of claim 14, wherein the natural language processing searching technique includes at least one of:

intent-driven dedicated search, named entity recognition boosting, or graph-based popularity searching.

17. The method of claim 14, wherein the full text searching technique includes at least one of full text searching or graph-based popularity searching.

18. A non-transitory computer-readable medium storing a set of instructions, the set of instructions comprising:

one or more instructions that, when executed by one or more processors of a device, cause the device to:

receive data associated with a set of taxonomies, wherein a taxonomy, of the set of taxonomies, represents a classification of a set of relationships of data entries of the data;

integrate, using a taxonomy harmonization model, the set of taxonomies to generate a meta-taxonomy of the data, wherein the meta-taxonomy includes one or more relationships between a first classification of a first taxonomy, of the set of taxonomies, and a second classification of a second taxonomy, of the set of taxonomies, wherein the first classification and the second classification are linked with the one or more relationships based on a similarity between the first classification and the second classification;

receive a search query;

identify a user profile for a user associated with the search query; and search the meta-taxonomy to identify one or more data entries, of the data, matching the search query based on the user profile; and transmit a response identifying at least one data entry of the one or more data entries matching the search query.

19. The non-transitory computer-readable medium of claim 18, wherein the one or more instructions, that cause the device to identify the user profile, cause the device to:

receive information identifying a user preference;

identify a set of other user profiles associated with other users based on the user preference; and import one or more other user preferences of the set of other user profiles into the user profile for the user.

20. The non-transitory computer-readable medium of claim 18, wherein the one or more instructions, that cause the device to identify the user profile, cause the device to:

identify a knowledge graph representing a set of historical transactions associated with the user, wherein the knowledge graph includes a set of weightings relating to at least one of a recency, a frequency, or a rating of a historical transaction of the set of historical transactions.

\* \* \* \* \*